US008856006B1

(12) United States Patent
Patel et al.

(10) Patent No.: US 8,856,006 B1
(45) Date of Patent: Oct. 7, 2014

(54) ASSISTED SPEECH INPUT

(71) Applicant: Google Inc., Mountain View, CA (US)

(72) Inventors: Nirmal Patel, Mountain View, CA (US);
Mat Balez, San Francisco, CA (US);
Thad Eugene Starner, Mountain View, CA (US)

(*) Notice: Subject to any disclaimer, the term of this patent is extended or adjusted under 35 U.S.C. 154(b) by 194 days.

(21) Appl. No.: 13/625,120

(22) Filed: Sep. 24, 2012

Related U.S. Application Data

(60) Provisional application No. 61/584,135, filed on Jan. 6, 2012.

(51) Int. Cl.
*G10L 15/00* (2013.01)
*G10L 15/18* (2013.01)
*G06F 17/27* (2006.01)

(52) U.S. Cl.
USPC .................... 704/257; 704/255; 704/9

(58) Field of Classification Search
CPC ........................................... G06F 17/27
USPC ................................. 704/9, 231–257
See application file for complete search history.

(56) References Cited

U.S. PATENT DOCUMENTS

| 5,323,316 A * | 6/1994 | Kadashevich et al. ............ 704/9 |
| 6,965,863 B1 | 11/2005 | Zuberec et al. |
| 8,005,679 B2 | 8/2011 | Jordan et al. |
| 2004/0181414 A1 | 9/2004 | Pyle et al. |
| 2005/0256891 A1 * | 11/2005 | Voln ............................. 707/101 |
| 2006/0218506 A1 | 9/2006 | Srenger et al. |
| 2010/0324888 A1 * | 12/2010 | Rachamim ....................... 704/9 |

* cited by examiner

*Primary Examiner* — Jesse Pullias

(57) ABSTRACT

Methods and systems are provided for assisted speech input. In one example, the method may involve (a) designating a first node of a tree as a current node. Each node in the tree is associated with a speech input data, and the first node includes one or more child nodes. The method may further involve (b) removing all nodes from a first group of nodes, (c) copying each child node of the current node to the first group, (d) removing all nodes from a second group of nodes, (e) moving a selection of nodes from the first group to the second group, and (f) presenting information associated with each node in the second group. The method may include additional elements depending on whether there is a match between a received speech input and a child node of the current node.

20 Claims, 7 Drawing Sheets

ASSISTED SPEECH INPUT

CROSS-REFERENCE TO RELATED APPLICATION

The present application claims priority to U.S. Provisional Application Ser. No. 61/584,135, filed on Jan. 6, 2012, the entire contents of which are incorporated by reference.

BACKGROUND

Unless otherwise indicated herein, the materials described in this section are not prior art to the claims in this application and are not admitted to be prior art by inclusion in this section.

Computing systems such as personal computers, laptop computers, tablet computers, cellular phones, among many other types of computing systems, are increasingly prevalent in numerous aspects of modern life. As computers become progressively more integrated with users' everyday life, the convenience, efficiency, and intuitiveness of the user-interfaces by which users interact with computing devices becomes progressively more important.

A user-interface may include various combinations of hardware and software which enable the user to, among other things, interact with a computing system. One example of a modern user-interface is "voice control" that may allow a user to provide speech data to a computing system. The speech data may be received and processed by the computing system, and ultimately may be used by the computing system as a basis for executing certain computing functions.

Voice control interfaces used to interact with a computing device may involve a steep learning curve. Such interfaces may require users must have an in-depth familiarity and/or understanding of the computing device to effectively interface with the device via "voice control." Accordingly, innovations to help computing-device users navigate and/or learn such voice control interfaces are welcome.

SUMMARY

The systems and methods described herein may help to provide for more convenient, efficient, and/or intuitive voice interaction with a computing device.

In one aspect, a computing device is provided. The computing device includes a non-transitory computer readable medium and program instructions stored on the non-transitory computer readable medium. The program instructions are executable by at least one processor to: (a) designate a first node of a tree as a current node. Each node in the tree is associated with a speech input data, and the first node includes one or more child nodes. The program instruction are further executable by the at least one processor to (b) remove all nodes from a first group of nodes, (c) copy each child node of the current node to the first group, (d) remove all nodes from a second group of nodes, (e) move a selection of nodes from the first group to the second group, and (f) presenting information associated with each node in the second group.

In another aspect, a non-transitory computer-readable medium is provided. The computer readable medium has stored thereon instructions executable by a computing device to perform functions including (a) designating a first node of a tree as a current node. Each node in the tree is associated with a speech input, and the first node includes one or more child nodes. The functions also include (b) removing all nodes from a first group of nodes, (c) copying each child node of the current node to the first group, (d) removing all nodes from a second group of nodes, (e) moving a selection of nodes from the first group to the second group, and (f) presenting information associated with each node in the second group.

In yet another aspect, a method is provided. The method involves (a) designating a first node of a tree as a current node. Each node in the tree is associated with a speech input, and the first node includes one or more child nodes. The method also involves (b) removing all nodes from a first group of nodes, (c) copying each child node of the current node to the first group, (d) removing all nodes from a second group of nodes, (e) moving a selection of nodes from the first group to the second group, and (f) causing a graphical display to present information associated with each node in the second group.

These as well as other aspects, advantages, and alternatives, will become apparent to those of ordinary skill in the art by reading the following detailed description, with reference where appropriate to the accompanying drawings.

DETAILED DESCRIPTION

Figure 1A:
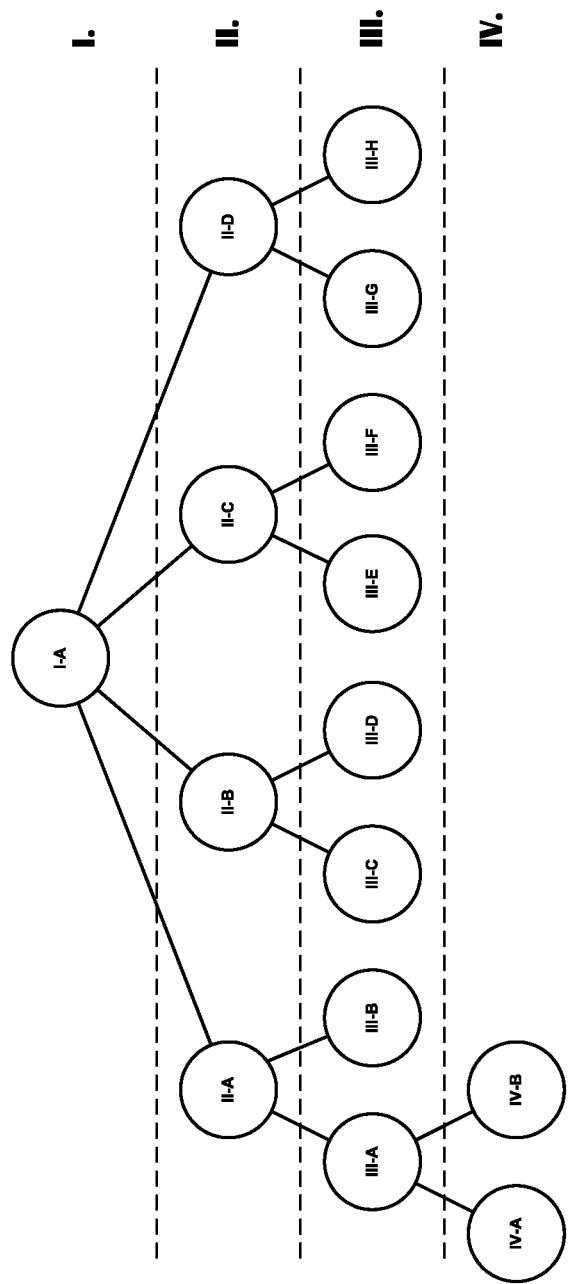
FIG. 1A depicts a general tree structure, in accordance with example embodiments.

In the following detailed description, reference is made to the accompanying figures, which form a part thereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

1. Overview

The learning curve required to use an input interface (such as a speech input system) for interacting with any given computing device may vary. A speech input system may use a "grammar" to define a set of rules mapping words or phrases to certain functions or actions. The grammar may further include rules for combining words into phrases, and phrases into other phrases. Along similar lines, the grammar may further include rules for parsing phrases into words or other phrases. Speech input systems based on relatively simple grammar, while easier for a novice user to learn, may be restrictive in functionality and fluidity. On the other hand, speech input systems based on relatively complex grammar, while providing more comprehensive functionality for an expert user, may be difficult for users to learn.

Accordingly, example embodiments include a speech input system that may be configured to guide the user through interfacing with the speech input system (including those based on a relatively complex grammar). In one example, when a computing device having a speech input system implemented thereon detects a user speaking to the computing device, the device may determine, based on the user's speech input and the grammar, next possible words and phrases that the user may speak to further interact with the system, and present—perhaps visually and/or audibly, as examples—those next-possible words and phrases to the user. As such, the user may be visually guided through voice control interactions with the computing device based on the grammar. The device might also "speak" these words and/or phrases using a speech synthesizer, perhaps in addition to (or instead of) a visual presentation via a display device. The device may continue to present next possible phrases until the user speaks a word phrase that is in the grammar. The computing device may also present (perhaps on a visual display), while the user is speaking, all words and/or phrases thus-far spoken that are part of the grammar. These presentations may further assist the user with learning the grammar.

Further, perhaps as the user becomes more familiar with the grammar, the computing device may allow the user to immediately speak an entire utterance (such as an entire series of next possible words and/or phrases), and may process the phrases as if the user had actually waited for the computing device to present a list of next possible words and phrases at each stage of the interaction.

If the next possible word or phrase could be one of many possible logically grouped objects (e.g., a name from a contact list or a restaurant name), the computing device may present a special item corresponding to that next possible phrase. In this case, the special item may be a prompt for speech input ("say a restaurant name"), and/or an application (associated with restaurant reviews and locations), among other possibilities. Thus, the computing device may present the special item rather than displaying each individual contact in an address book, for example.

The computing device may present next-possible phrases upon detecting speech/user-input pauses. As another variation, the device may determine the user's level of experience with the grammar, perhaps based on previous speech, and determine whether or how to present a list of next possible phrases based on the level of experience. Further, the system may adapt to the user's grammar experience or tendencies, such that the system may be tolerant of phrases seemingly unrelated to any of the possible phrases.

In an embodiment, an input system other than a speech input system may be used. For example, the input system may take the form of a touchscreen and/or a mouse, among other possibilities. The computing device may further be configured to receive logic-group input, such as a contact name, using an alternate input, for example. The computing device may also receive free-form input, such as a restaurant name, using a text-input technique, as another possibility. As still another possibility, the computing device may allow entry of an entire phrase using text- or keyboard-input, thus treating the items being presented as suggestions from a completion engine.

2. Example Methods for Assisted Speech Input

As discussed above, a user may interact with a computing device via voice control, and the computing device may include a speech input system configured to guide the user through the interactions, based on a grammar. In one case, the grammar may be represented as a tree structure. FIG. 1A depicts a general tree structure having four levels, I-IV. As shown, node I-A in level I has four child nodes II-A-II-D in level II, and each node in level II has child nodes in level III, and so on. Accordingly, a grammar tree may be implemented such that a first word or phrase may be represented by a first node (I-A) in the grammar tree, and possible next words or phrases after the first word or phrase are represented by child nodes (II-A-II-D) of the first node in the grammar tree.

Figure 1B:
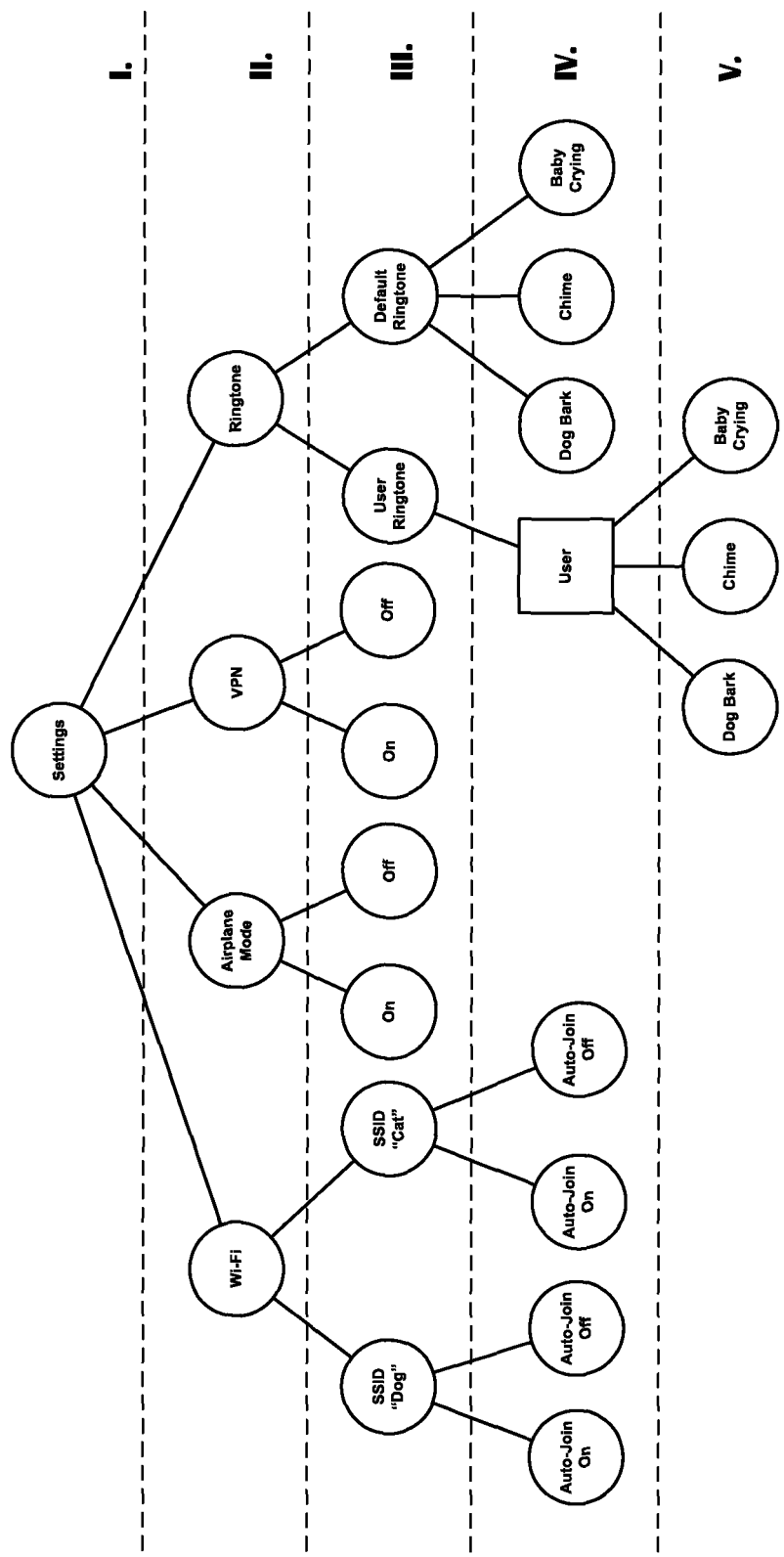
FIG. 1B depicts an example grammar tree structure, in accordance with example embodiments.

As such, guiding the user through voice control interactions may involve assisting the user in navigating between nodes in a grammar tree. FIG. 1B depicts an example grammar tree structure for changing settings in a computing device, in accordance with example embodiments. As shown, the grammar tree structure of FIG. 1B includes multiple node levels, including levels I-V. Level I may include a "Settings" node, representing that the word "Settings" may be input into the computing device as part of a phrase that can change one or more settings of the device. The settings menu may contain Wi-Fi settings, Airplane Mode settings, VPN settings, and Ringtone settings, among numerous other possibilities. As shown, each of the settings included in the settings menu may be represented as nodes in level II. Each of these settings may in turn include one or more settings, as provided in level III. In one case, the level II nodes may be referred to as child nodes of an associated level I node. For instance, the Wi-Fi settings node may be referred to as a child node of the settings node.

Figure 2:
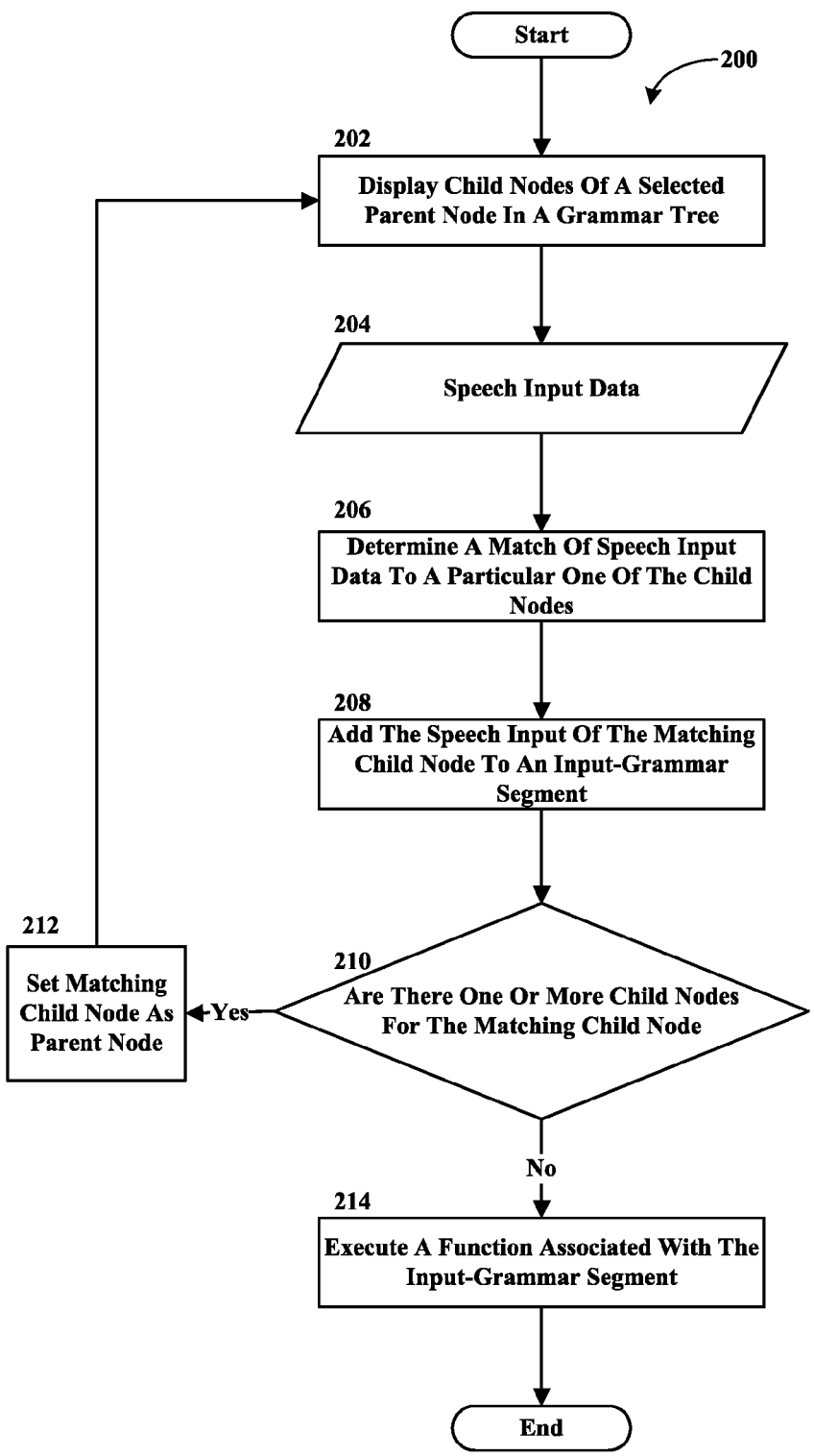
FIG. 2 depicts a flowchart of a first method, in accordance with example embodiments.

FIG. 2 is a flowchart of a method 200, in accordance with example embodiments. As shown, the method begins at 202, with a computing device presenting child nodes of a selected parent node in a grammar tree, such as the tree structure of FIG. 1. For example, the child nodes of the Settings node, including at least the Wi-Fi node, Airplane Mode node, VPN node, and Ringtone node, may be visually presented on a display of the computing device, audibly presented via a speaker of the device, etc. The computing device could present all of the child nodes of the Settings node, or could present less than all of the child nodes.

At 204, the computing device receives speech input data. In one example, the computing device may receive speech input data via a microphone of the computing device. The computing device may receive speech input data based on first detecting speech by the user, and subsequently determining whether the user's speech is associated with the presented child nodes.

The method 200 continues at 206 with the computing device determining a match of speech input data to a particular one of the child nodes. As discussed above, the speech input corresponding to the VPN node, which is a child node of the Settings node, may include "VPN." Accordingly, the computing device may be configured to process the speech input to determine whether "VPN" was spoken by the user.

The computing device may be configured to recognize more than one word or phrase as being associated with any respective node. For instance, a grammar represented by FIG. 1B may include initiating speech input for one or more of the presented child nodes. As one example, the initiating speech input may involve the user first saying "select" followed by the name of a setting such as "VPN". The computing device may accordingly match the spoken word "VPN" or the spoken phrase "select VPN" with the VPN child node, but might not match the phrase "choose VPN".

The method continues at 208 with the computing device adding the speech input of the particular one of the child nodes to an input-grammar segment. In one example, the input-grammar segment may be a series of speech inputs which may be processed and identified as a command to execute certain functions. Continuing with the example of the speech input "VPN," if the computing device determines a match between the spoken word "select VPN" and an allowed speech input data associated a particular one of the child nodes, the speech input "select VPN" may be added to the input-grammar segment. In this particular case, the input-grammar segment may previously include the speech input "Settings" associated with the Settings parent node of the VPN node. As such, the input-grammar segment may include "Settings-Select VPN," for example.

At 210, a determination may be made on whether there are one or more child nodes for the matching child node. Referring back to the VPN example, the determination at 210 may indicate that there is an On node and Off node that are child nodes of the VPN node. On the other hand, if the parent node in this case is the On node itself, than the determination at 210 may indicate there are no child nodes.

If there are one or more child nodes for the matching node, as is the case in the above discussed example of the VPN node, the computing device may set the matching child node as the parent node at 212. As such, the VPN node may be set as the parent node, and the On and Off nodes may become the child nodes. Further in this case, 202-208 may be repeated to further add speech inputs to the input-grammar segment. For example, the ensuing speech input may include "Off." Accordingly, the input-grammar segment may include "Settings-Select VPN-Off."

This repetition of 202-208 may be repeated until there are no child nodes for a selected parent node. Continuing with the VPN example, upon adding "Off" to the input-grammar segment, the computing system may determine that the Off node does not have one or more child nodes, and may proceed to 214 to a function associated with the input-grammar segment. Using the VPN example, the function associated with "Settings-Select VPN-Off" may involve turning off the VPN capabilities of the relevant computing device.

As discussed above in connection to 202 of method 200, the computing device may present the child nodes of the selected parent node in the grammar tree. In other words, the child nodes may be provided to the user such that the user has an idea of what speech inputs may be recognized and processed to achieve a desired interaction. In this case, the computing device may be configured to receive the speech data in response to presenting the child nodes via the display. In another case, an experienced user may not need to rely on the display of child nodes when providing speech inputs. As such, in one embodiment, the computing device may be further configured to receive speech input without first presenting the child nodes.

In a further example, additional speech command options may be available via the grammar tree. For instance, the VPN node may contain a "Back" child node in addition to the On node and Off node. The computing device, upon detecting a speech input of "back", may responsively set the parent node as the Settings node and await a speech input associated with a child node of the Settings node.

Figure 3:
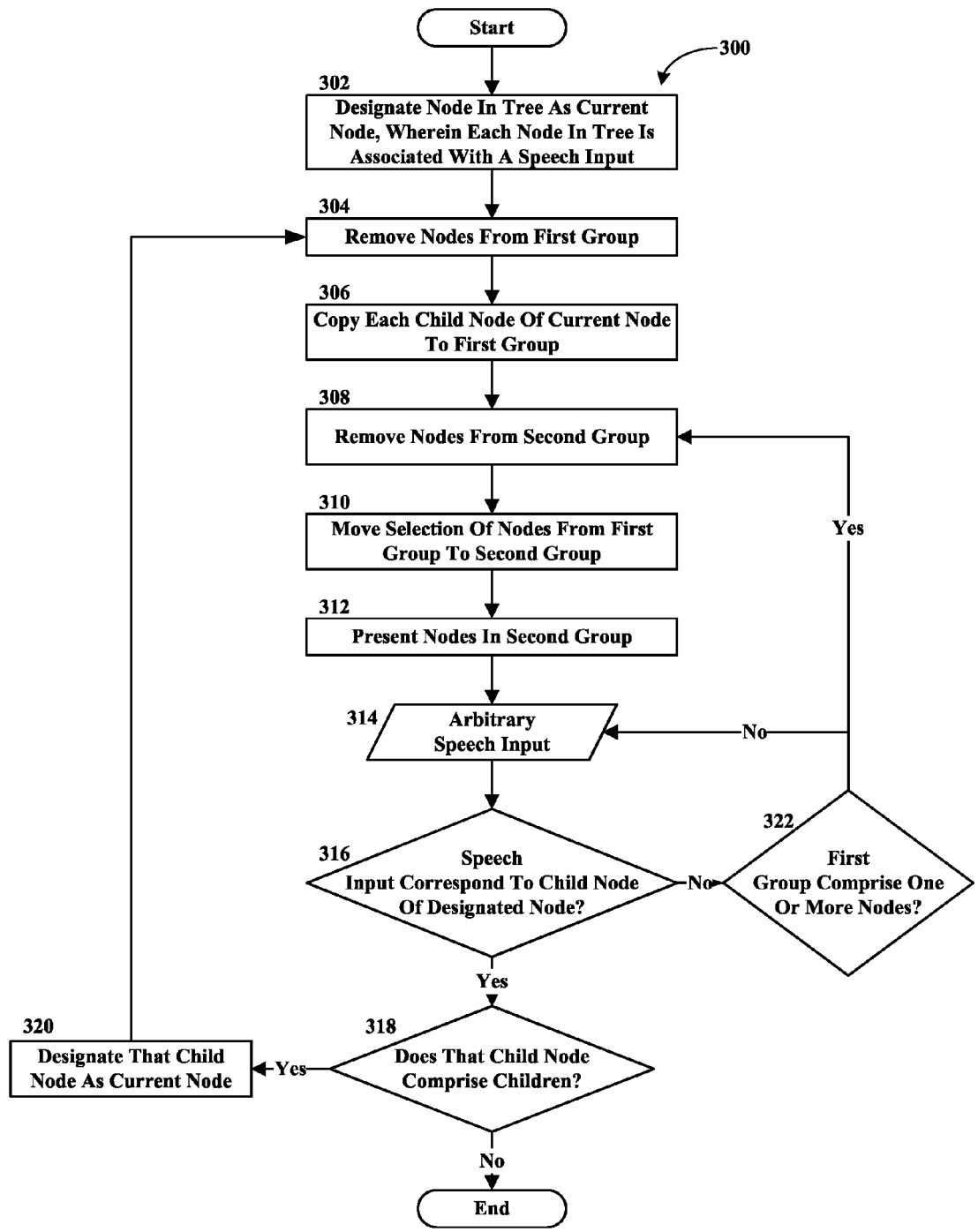
FIG. 3 depicts a flowchart of a second method, in accordance with example embodiments.

FIG. 3 is a flowchart of a method 300, in accordance with an example embodiment. In particular, method 300 may provide an embodiment for displaying child nodes of a designated node. As shown, the method begins at 302, with a computing device designating a node of a tree as a current node. In one example, the computing device may designate the root node of the tree as the current node. In another example, the computing device may designate a current node based on a direct or indirect selection by the user.

The method 300 continues at 304 with the computing device removing all nodes from a first group of nodes. In one example, the first group of nodes may include nodes associated with a previously designated current node. As such, with the designation of the first node as the current node, nodes associated with the previously designated current node maybe removed. At 306, the computing device may then copy each child node of the new current node to the first group. The method continues at 308 with the computing device removing all nodes from a second group of nodes. Similar to the first group of nodes, the second group of nodes may include nodes associated with a previously designated current node, and as such, with the designation of the first node as the current node, nodes associated with the previously designated current node may be removed.

At 310, the computing device may move a selection of nodes from the first group to the second group. In one example, the selection of nodes from the first group may be determined based on a frequency of speech inputs associated with nodes in the first group of nodes. For instance, referring back to FIG. 1, the current node may be the Settings node, and the child nodes Wi-Fi, Airplane Mode, VPN, and Ringtone may have been copied to the first group of nodes. Among the child nodes, speech input data associated with the Wi-Fi and VPN nodes may have been the most commonly received speech inputs. As such, the child nodes Wi-Fi and VPN may be moved from the first group of nodes to the second group of nodes. As another possibility, nodes associated with less frequent speech inputs may be moved to the second group.

The method continues at 312 with the computing device presenting the nodes in the second group. As discussed previously, the nodes in the second group may be provided on a display for the user to view. In one example, the display may not have space to show each child node of the current node, and accordingly, the second group of nodes including a subset of the child nodes of the current node may be selected to be shown on the display. In other words, in this case, only the child nodes Wi-Fi and VPN may be provided on the display for the user to view.

At 314, the computing device receives an arbitrary speech input. Similar to 204 of the method 200, the computing device may receive arbitrary speech input data via a microphone of the computing device. At 316, a determination is made as to whether the arbitrary speech input corresponds to a speech input of a child node of the current node. In this case, the speech input may be associated with a node in the second group, the first group, or a node previously in (but now removed from) the first and second groups. For instance, a user may provide speech input associated with a child node in the second group, in response to being visually presented the child node in the second group. In another instance, if a user is familiar with the grammar, the user may provide speech input associated with a child node in the first group, which has not yet been presented, because the user knows that the particular child node is an option.

In either case, if the arbitrary speech input corresponds to a speech input of a child node of the current node, then the method 300 may proceed to 318 to determine whether that corresponding child node itself has any child nodes. If the corresponding child node has one or more child nodes, then the method 300 may proceed to 320, where the computing device may designate the corresponding child node as the current node. Referring to the example above, if the arbitrary speech input includes "Wi-Fi," the computing system will then determine whether the Wi-Fi node has child nodes. As shown, the Wi-Fi node does have children, and accordingly, the Wi-Fi node may be designated as the current node. The method 300 may then proceed back to 304, and performs 304-318 until the associated child node does not have one or more child nodes. In the Wi-Fi example, 304-318 may be performed until speech input corresponding to one of the level IV nodes in the Wi-Fi node family has been received.

Referring back to 316, if the arbitrary speech input does not correspond to a speech input of an associated child node of the designated node, then the method 300 may proceed to 322 to determine whether the first group of nodes include additional child nodes of the current node. If the first group of nodes does not include additional child nodes of the current node, the method 300 may proceed back to 314 to await another arbitrary speech input. As another possibility, certain nodes may be designated as "do not display" nodes (such as a "Back" node or "Cancel" node); if the first group includes only these do not display nodes, then method 300 may proceed again to 314. If the first group of nodes does include additional child nodes of the current node, the method 300 may proceed back to 308 to remove the nodes from second group of nodes, and at 310, move a selection (or the remaining) child nodes of the current node in the first group of nodes to the second group of nodes.

In the examples above, where Wi-Fi and VPN nodes were moved to the second group of nodes, the Airplane Mode and Ringtone nodes may still be in the first group of nodes. In this case, if the arbitrary speech input is determined to not correspond to any of the Wi-Fi, VPN, Airplane Mode, or Ringtone nodes, the method 300 may proceed back to 308 where the Wi-Fi and VPN nodes in the second ground of nodes may be removed, and where in 310, the Airplane Mode and Ringtone nodes may be moved to the second group. The method 300 may then proceed through 312-322 as appropriate. This may be the case when a user wishes to select Airplane Mode, but is not very familiar with the grammar, and therefore waits for the Airplane Mode option to be provided on the graphical display before providing the corresponding speech input.

3. Example System and Device Architecture

In general, the example methods discussed previously may be implemented on a system, which may take the form of a wearable computer. Further, the example methods may be implemented on other devices, such as a mobile phone, among others. In addition, the example methods may take the form of instructions stored on a non-transitory computer readable medium. In this case, the stored instructions may be executable by at a processor to provide the functionality described.

Figure 4A:
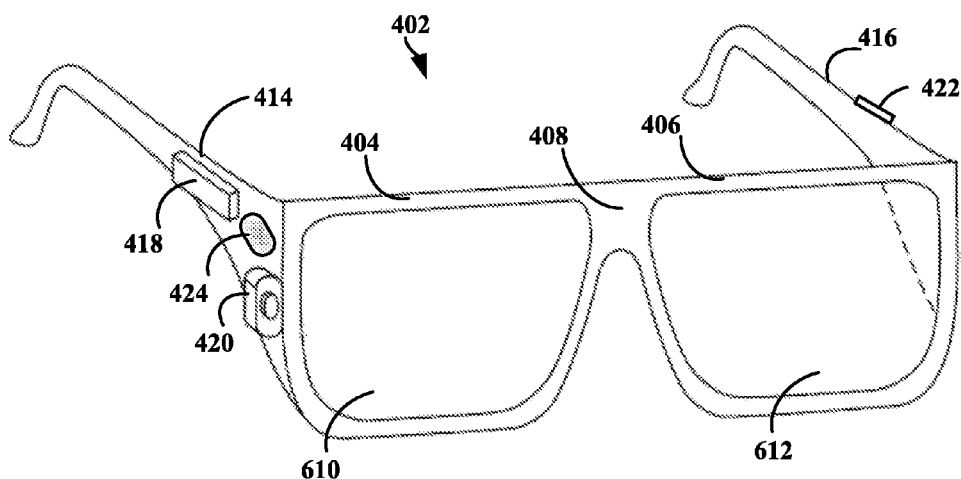
FIG. 4A depicts a first view of a wearable computing system, in accordance with example embodiments.

FIG. 4A illustrates a wearable computing system on which the example methods discussed above may be implemented, according to an example embodiment. In FIG. 4A, the wearable computing system takes the form of a head-mounted device (HMD) 402 (which may also be referred to as a head-mounted display). It should be understood, however, that example systems and devices may take the form of or be implemented within or in association with other types of devices, without departing from the scope of the invention. As illustrated in FIG. 4A, the head-mounted device 402 includes frame elements including lens-frames 404 and 406 and a center frame support 408, lens elements 410 and 410, and extending side-arms 414 and 416. The center frame support 408 and the extending side-arms 414 and 416 are configured to secure the head-mounted device 402 to a user's face via a user's nose and ears, respectively.

Each of the frame elements 404, 406, and 408 and the extending side-arms 414 and 416 may be formed of a solid structure of plastic and/or metal, or may be formed of a hollow structure of similar material so as to allow wiring and component interconnects to be internally routed through the head-mounted device 402. Other materials may be possible as well.

One or more of each of the lens elements 410 and 412 may be formed of any material that can suitably display a projected image or graphic. Each of the lens elements 410 and 412 may also be sufficiently transparent to allow a user to see through the lens element. Combining these two features of the lens elements may facilitate an augmented reality or heads-up display where the projected image or graphic is superimposed over a real-world view as perceived by the user through the lens elements.

The extending side-arms 414 and 416 may each be projections that extend away from the lens-frames 404 and 406, respectively, and may be positioned behind a user's ears to secure the head-mounted device 402 to the user. The extending side-arms 414 and 416 may further secure the head-mounted device 402 to the user by extending around a rear portion of the user's head. Additionally or alternatively, for example, the HMD 402 may connect to or be affixed within a head-mounted helmet structure. Other possibilities exist as well.

The HMD 402 may also include an on-board computing system 418, a video camera 420, a sensor 422, and a finger-operable touch pad 424. The on-board computing system 418 is shown to be positioned on the extending side-arm 414 of the head-mounted device 402; however, the on-board computing system 418 may be provided on other parts of the head-mounted device 402 or may be positioned remote from the head-mounted device 402 (e.g., the on-board computing system 418 could be wire- or wirelessly-connected to the head-mounted device 402). The on-board computing system 418 may include a processor and memory, for example. The on-board computing system 418 may be configured to receive and analyze data from the video camera 420 and the finger-operable touch pad 424 (and possibly from other sensory devices, user interfaces, or both) and generate images for output by the lens elements 410 and 412.

The video camera 420 is shown positioned on the extending side-arm 414 of the head-mounted device 402; however, the video camera 420 may be provided on other parts of the head-mounted device 402. The video camera 420 may be configured to capture images at various resolutions or at different frame rates. Many video cameras with a small form-factor, such as those used in cell phones or webcams, for example, may be incorporated into an example of the HMD 402.

Further, although FIG. 4A illustrates one video camera 420, more video cameras may be used, and each may be configured to capture the same view, or to capture different views. For example, the video camera 420 may be forward facing to capture at least a portion of the real-world view perceived by the user. This forward facing image captured by the video camera 420 may then be used to generate an augmented reality where computer generated images appear to interact with the real-world view perceived by the user.

The sensor 422 is shown on the extending side-arm 416 of the head-mounted device 402; however, the sensor 422 may be positioned on other parts of the head-mounted device 402. The sensor 422 may include one or more of a gyroscope or an accelerometer, for example. Other sensing devices may be included within, or in addition to, the sensor 422 or other sensing functions may be performed by the sensor 422.

The finger-operable touch pad 424 is shown on the extending side-arm 414 of the head-mounted device 402. However, the finger-operable touch pad 424 may be positioned on other parts of the head-mounted device 402. Also, more than one finger-operable touch pad may be present on the head-mounted device 402. The finger-operable touch pad 424 may be used by a user to input commands. The finger-operable touch pad 424 may sense at least one of a position and a movement of a finger via capacitive sensing, resistance sensing, or a surface acoustic wave process, among other possibilities. The finger-operable touch pad 424 may be capable of sensing finger movement in a direction parallel or planar to the pad surface, in a direction normal to the pad surface, or both, and may also be capable of sensing a level of pressure applied to the pad surface. The finger-operable touch pad 424 may be formed of one or more translucent or transparent insulating layers and one or more translucent or transparent conducting layers. Edges of the finger-operable touch pad 424 may be formed to have a raised, indented, or roughened surface, so as to provide tactile feedback to a user when the user's finger reaches the edge, or other area, of the finger-operable touch pad 424. If more than one finger-operable touch pad is present, each finger-operable touch pad may be operated independently, and may provide a different function.

Figure 4B:
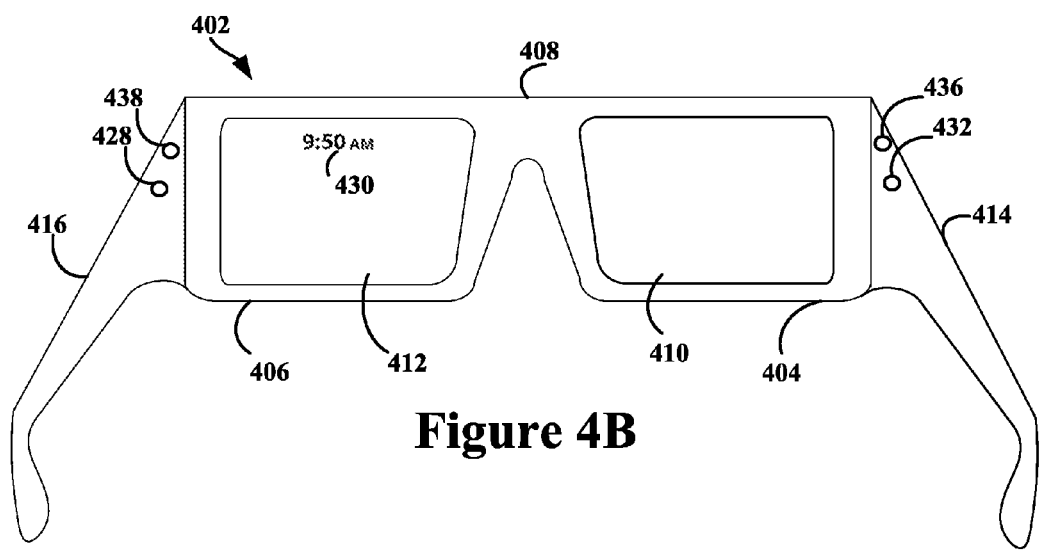
FIG. 4B depicts a second view of a wearable computing system, in accordance with example embodiments.

FIG. 4B illustrates an alternate view of the wearable computing device illustrated in FIG. 4A. As shown in FIG. 4B, the lens elements 410 and 412 may act as display elements. The head-mounted device 402 may include a first projector 428 coupled to an inside surface of the extending side-arm 416 and configured to project a display 430 onto an inside surface of the lens element 412. Additionally or alternatively, a second projector 432 may be coupled to an inside surface of the extending side-arm 414 and configured to project a display 434 onto an inside surface of the lens element 410.

The head-mounted device 402 may also include one or more sensors coupled to an inside surface of head-mounted device 402. For example, as shown in FIG. 4B, sensor 436 coupled to an inside surface of the extending side-arm 414, and/or sensor 438 coupled to an inside surface of the extending side-arm 416. The one or more sensors could take the form of a still or video camera (such as a charge-coupled device or CCD), any of the forms discussed with reference to sensor 422, and/or numerous other forms, without departing from the scope of the claims. The one or more sensors (perhaps in coordination with one or more other entities) may be configured to perform eye tracking, such as gaze-target tracking, etc.

The lens elements 410, 412 may act as a combiner in a light projection system and may include a coating that reflects the light projected onto them from the projectors 428 and 432. In some embodiments, a reflective coating may not be used (e.g., when the projectors 428 and 432 are scanning laser devices).

In alternative embodiments, other types of display elements may also be used. For example, the lens elements 410 and 412 themselves may include a transparent or semi-transparent matrix display such as an electroluminescent display or a liquid crystal display, one or more waveguides for delivering an image to the user's eyes, and/or or other optical elements capable of delivering an in focus near-to-eye image to the user, among other possibilities. A corresponding display driver may be disposed within the frame elements 404, 406 for driving such a matrix display. Alternatively or additionally, a laser or LED source and scanning system could be used to draw a raster display directly onto the retina of one or more of the user's eyes. Other possibilities exist as well.

Figure 5A:
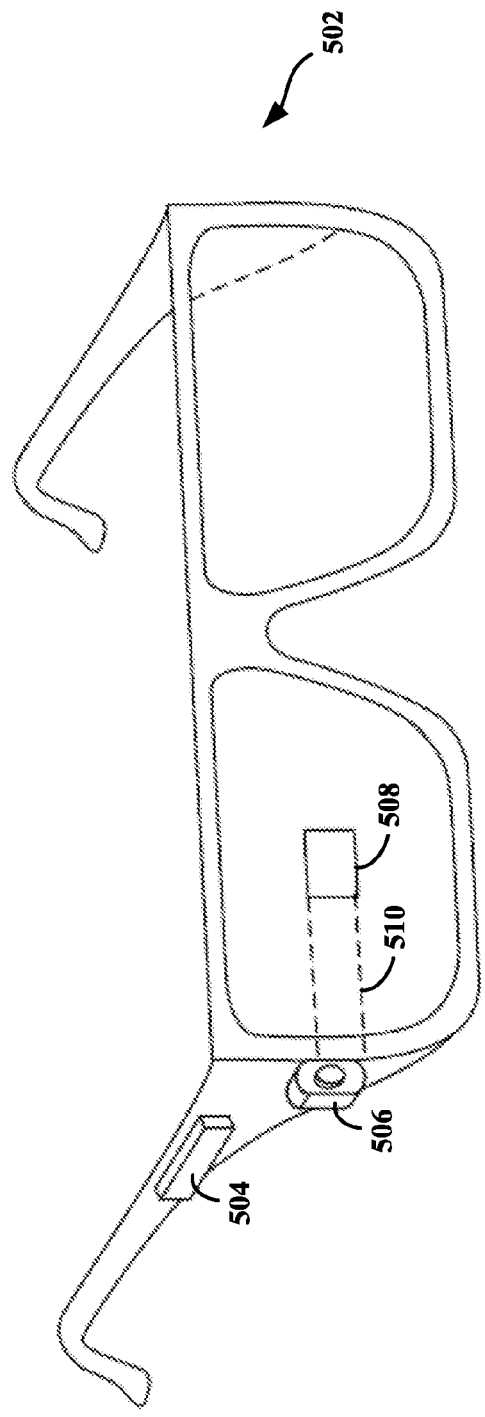
FIG. 5A depicts a third view of a wearable computing system, in accordance

FIG. 5A illustrates another wearable computing system on which the methods discussed above may be implemented, according to an example embodiment, which takes the form of an HMD 502. The HMD 502 may include frame elements and side-arms such as those described with respect to FIGS. 4A and 4B. The HMD 502 may additionally include an on-board computing system 504 and a video camera 506, such as those described with respect to FIGS. 4A and 4B. The video camera 506 is shown mounted on a frame of the HMD 502. However, the video camera 506 may be mounted at other positions as well.

As shown in FIG. 5A, the HMD 502 may include a single display 508 which may be coupled to the device. The display 508 may be formed on one of the lens elements of the HMD 502, such as a lens element described with respect to FIGS. 4A and 4B, and may be configured to overlay computer-generated graphics in the user's view of the physical world. The display 508 is shown to be provided in a center of a lens of the HMD 502, however, the display 508 may be provided in other positions. The display 508 is controllable via the computing system 504 that is coupled to the display 508 via an optical waveguide 510.

Figure 5B:
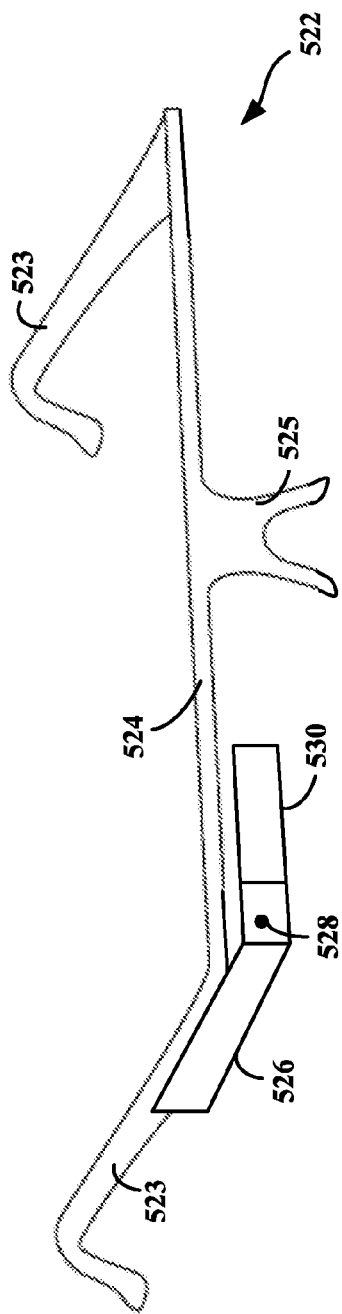
FIG. 5B depicts a fourth view of a wearable computing system, in accordance with example embodiments.

FIG. 5B illustrates another wearable computing system according to an example embodiment, which takes the form of an HMD 522. The HMD 522 may include side-arms 523, a center frame support 524, and a bridge portion with nose-piece 525. In the example shown in FIG. 5B, the center frame support 524 connects the side-arms 523. The HMD 522 does not include lens-frames containing lens elements. The HMD 522 may additionally include an on-board computing system 526 and a video camera 528, such as those described with respect to FIGS. 4A and 4B.

The HMD 522 may include a single lens element 530 that may be coupled to one of the side-arms 523 or the center frame support 524. The lens element 530 may include a display such as the display described with reference to FIGS. 4A and 4B, and may be configured to overlay computer-generated graphics upon the user's view of the physical world. In one example, the single lens element 530 may be coupled to the inner side (i.e., the side exposed to a portion of a user's head when worn by the user) of the extending side-arm 523. The single lens element 530 may be positioned in front of or proximate to a user's eye when the HMD 522 is worn by a user. For example, the single lens element 530 may be positioned below the center frame support 524, as shown in FIG. 5B.

Figure 6:
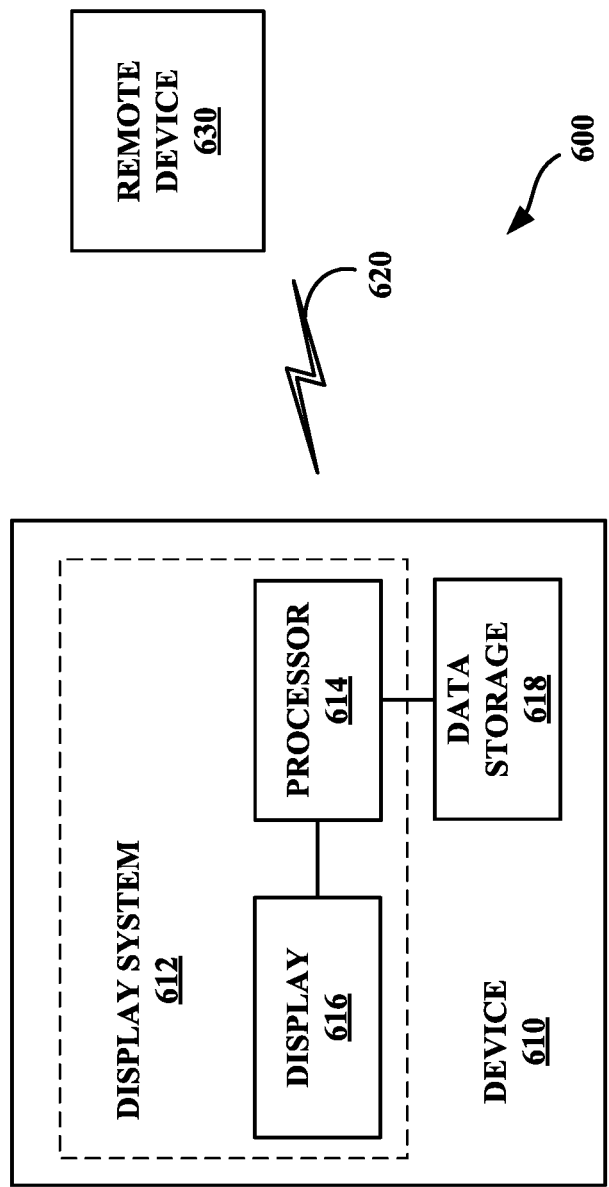
FIG. 6 is a simplified block diagram of a computing device, in accordance with example embodiments.

FIG. 6 illustrates a schematic drawing of a computing device on which the methods described above may be implemented, according to an example embodiment. In system 600, a device 610 communicates using a communication link 620 (e.g., a wired or wireless connection) to a remote device 630. The device 610 may be any type of device that can receive data and display information corresponding to or associated with the data. For example, the device 610 may be a heads-up display system, such as the head-mounted devices 402, 502, or 522 described with reference to FIGS. 4A, 4B, 5A, and 5B.

Thus, the device 610 may include a display system 612 comprising a processor 614 and a display 616. The display 616 may be, for example, an optical see-through display, an optical see-around display, or a video see-through display. The processor 614 may receive data from the remote device 630, and configure the data for display on the display 616. The processor 614 may be any type of processor, such as a micro-processor or a digital signal processor, for example.

The device 610 may further include on-board data storage, such as memory data storage 618 coupled to the processor 614. The data storage 618 may store software and/or other instructions that can be accessed and executed by the processor 614, for example.

The remote device 630 may be any type of computing device or transmitter including a laptop computer, a mobile telephone, or tablet computing device, etc., that is configured to transmit data to the device 610. The remote device 630 and the device 610 may contain hardware to enable the communication link 620, such as processors, transmitters, receivers, antennas, etc.

In FIG. 6, the communication link 620 is illustrated as a wireless connection; however, wired connections may also be used. For example, the communication link 620 may be a wired serial bus such as a universal serial bus or a parallel bus. A wired connection may be a proprietary connection as well. The communication link 620 may also be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. The remote device 630 may be accessible via the Internet and may include a computing cluster associated with a particular web service (e.g., social-networking, photo sharing, address book, etc.).

While the discussions above refer generally to implementation of the disclosed embodiments on an HMD, one having ordinary skill in the art will appreciate that the discussed embodiments for interactive and assisted speech input may also be implemented on other computing devices, such as cellular phones or tablet computers, for example.

4. Conclusion

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

Since many modifications, variations, and changes in detail can be made to the described example, it is intended that all matters in the preceding description and shown in the accompanying figures be interpreted as illustrative and not in a limiting sense. Further, it is intended to be understood that the following clauses further describe aspects of the present description.

We claim:

1. A computing device comprising:
a non-transitory computer readable medium; and
program instructions stored on the non-transitory computer readable medium and executable by at least one processor to:
 (a) designate a first node of a tree as a current node, wherein each node in the tree is associated with a speech input data, wherein the first node comprises one or more child nodes;
 (b) remove all nodes from a first group of nodes;
 (c) copy each child node of the current node to the first group;
 (d) remove all nodes from a second group of nodes;
 (e) move a selection of nodes from the first group to the second group; and
 (f) present information associated with each node in the second group.

2. The computing device of claim 1, wherein the program instructions are further executable by the at least one processor to:
receive an arbitrary speech input;
determine that the arbitrary speech input corresponds to speech input data associated with a second node that is a child node of the current node; and
add the speech input of the current child node to an input-grammar segment.

3. The computing device of claim 2, wherein the program instructions are further executable by the at least one processor to:
determine that the second node comprises one or more child nodes; and designate the second node as the current node.

4. The computing device of claim 3, wherein the program instructions are further executable by the at least one processor to:
perform (b)-(f).

5. The computing device of claim 2, wherein the program instructions are further executable by the at least one processor to:
determine that the second node does not comprise one or more child nodes, and
execute a function associated with the second node.

6. The computing device of claim 1, wherein the program instructions are further executable by the at least one processor to:
receive an arbitrary speech input;
determine that the arbitrary speech input does not correspond to speech input data associated with a child node of the current node; and
perform functions (d)-(f).

7. The computing device of claim 1, wherein the program instructions are further executable by the at least one processor to:
receive an arbitrary speech input;
determine a match between the arbitrary speech input and a speech input data associated with a child node of the current node; and
add the speech input associated a child nodes to an input-grammar segment.

8. The computing device of claim 7, wherein the received arbitrary speech input matches a speech input data associated with a child node in the second group.

9. The computing device of claim 7, wherein the received arbitrary speech input matches a speech input data associated with a child node in the first group.

10. The computing device of claim 7, wherein the program instructions are further executable by the at least one processor to:
receive initial speech input data before presenting information associated with each node in the second group; and determine that the initial speech input data matches speech input data associated with a child node of the current node.

11. The computing device of claim 1, wherein program instructions executable by the at least one processor to move a selection of nodes from the first group to the second group comprise program instructions executable by the at least one processor to determine the selection of nodes from the first group to the second group based on a frequency of speech inputs associated with nodes in the first group of nodes.

12. The computing device of claim 1, further comprising a head-mountable display (HMD), wherein the program instructions executable by the at least one processor to present information associated with each node in the second group comprise instructions executable by the at least one processor to display the nodes in the second group on a graphical display of the HMD.

13. A non-transitory computer-readable medium having stored thereon instructions executable by a computing device to cause the computing device to cause the computing device to perform functions comprising:
   (a) designating a first node of a tree as a current node, wherein each node in the tree is associated with a speech input, wherein the first node comprises one or more child nodes;
   (b) removing all nodes from a first group of nodes;
   (c) copying each child node of the current node to the first group;
   (d) removing all nodes from a second group of nodes;
   (e) moving a selection of nodes from the first group to the second group; and
   (f) presenting information associated with each node in the second group.

14. The non-transitory computer-readable medium of claim 13, wherein the instructions are further executable to cause the computing device to perform functions comprising:
   receiving an arbitrary speech input;
   determining that the arbitrary speech input corresponds to speech input data associated with a second node that is a child node of the current node; and
   adding the speech input data associated with the second node to an input-grammar segment.

15. The non-transitory computer-readable medium of claim 14, wherein the instructions are further executable to cause the computing device to perform functions comprising:
   determining that the second node does not comprise one or more child nodes, and
   executing a function associated with the second node.

16. The non-transitory computer-readable medium of claim 13, wherein the instructions are further executable to cause the computing device to:
   receiving an arbitrary speech input;
   determining that the arbitrary speech input does not correspond to speech input data associated with a child node of the current node; and
   performing (d)-(g).

17. A computer-implemented method comprising:
   (a) designating a first node of a tree as a current node, wherein each node in the tree is associated with a speech input, wherein the first node comprises one or more child nodes;
   (b) removing all nodes from a first group of nodes;
   (c) copying each child node of the current node to the first group;
   (d) removing all nodes from a second group of nodes;
   (e) moving a selection of nodes from the first group to the second group;
   (f) causing a computing device to present information associated with each node in the second group.

18. The method of claim 17, further comprising:
   receiving an arbitrary speech input;
   determining that the arbitrary speech input corresponds to speech input data associated with a second node that is a child node of the current node; and
   adding the speech input associated with the second node to an input-grammar segment.

19. The method of claim 18, wherein the received arbitrary speech input matches a speech input data associated with a child node in the second group.

20. The method of claim 18, wherein the received arbitrary speech input matches a speech input data associated with a child node in the first group.

* * * * *